(12) United States Patent
Hameleers et al.

(10) Patent No.: US 6,920,134 B2
(45) Date of Patent: Jul. 19, 2005

(54) METHOD FOR TRANSPORTING PHYSICAL OBJECTS, TRANSPORTATION SYSTEM AND TRANSPORTATION MEANS

(75) Inventors: Heino Hameleers, Kerkrade (NL); Frank Hundscheidt, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 893 days.

(21) Appl. No.: 09/740,924

(22) Filed: Dec. 19, 2000

(65) Prior Publication Data

US 2001/0026549 A1 Oct. 4, 2001

(30) Foreign Application Priority Data

Dec. 20, 1999 (EP) ............................................. 99125394

(51) Int. Cl.[7] ............................................. H04L 12/28
(52) U.S. Cl. ....................... 370/389; 370/328; 370/352; 370/356; 370/395; 235/375; 235/384
(58) Field of Search ................................. 370/328, 352, 370/356, 395, 389; 235/375, 384

(56) References Cited

U.S. PATENT DOCUMENTS

| | | | | |
|---|---|---|---|---|
| 5,793,762 | A | * | 8/1998 | Penners et al. ............. 370/389 |
| 5,797,113 | A | | 8/1998 | Kambe et al. ............... 701/201 |
| 5,869,819 | A | | 2/1999 | Knowles et al. ............ 235/375 |
| 6,418,139 | B1 | * | 7/2002 | Akhtar ........................ 370/356 |
| 6,529,499 | B1 | * | 3/2003 | Doshi et al. ................ 370/352 |
| 6,680,922 | B1 | * | 1/2004 | Jorgensen ................... 370/328 |

OTHER PUBLICATIONS

Bowler, A., European Search Report, Application No. EP99125394, May 12, 2000, pp. 1–4.
Kamoun, F. et al., "A Neural Network Shortest Path Algorithm for Optimum Routing in Packet–Switched Communications Networks," IEEE Global Telecommunications Conference, GLOBECOM '91, Phoenix, Arizona, Dec. 2–5, 1991, pp. 120–124.
Zaumen, W.T. et al., "Dynamics of Distributed Shortest–Path Routing Algorithms,"Computer Communication Review, vol. 21, No. 4, Sep. 1991, SIGCOMM '91 Conference, Zurich Switzerland, Sep. 3–6, 1991, pp. 31–42.
Andrew S. Tanenbaum, *Computer Networks*, Third Edition, Prentice–Hall International (UK) Limited; London 1996.
Form PCT/ISA/210 International Search Report completed Jan. 23, 2001for PCT/EP00/11408 (2pgs).

* cited by examiner

*Primary Examiner*—Alpus H. Hsu
*Assistant Examiner*—Clemence Han (57) ABSTRACT

The invention relates to a method for transporting physical objects, wherein at least one physical object is transported from a sending station to a receiving station, wherein the transport occurs through at least one physical router, wherein the physical router executes a decision about further parameters of transport to another physical router or to the receiving station.

According to the invention information for handling and moving the physical object is generated and transferred to a logical node, wherein the information is used to handle and move the physical packets according to a handling and moving of packets in a telecommunication protocol and wherein the logical node transfers the decision to the sending station and/or at least one physical router.

22 Claims, 4 Drawing Sheets

METHOD FOR TRANSPORTING PHYSICAL OBJECTS, TRANSPORTATION SYSTEM AND TRANSPORTATION MEANS

DESCRIPTION

The invention relates to a method for transporting physical objects, wherein at least one physical object is transported from a sending station to a receiving station, wherein the transport occurs through at least one physical guide, wherein the physical guide executes a decision about further parameters of transport to another physical guide or to the receiving station.

The physical guide may be a physical router as well as a physical switch.

The invention further relates to a transportation system for the transport of physical objects, wherein the transportation system includes means for transport of at least one physical object from a sending station to a receiving station, wherein the transportation system includes at least one physical guide, wherein the physical guide is capable of executing a decision about further parameters of transport to another physical guide or to the receiving station.

Physical objects are any objects which can have an effect in the physical world. They are most preferably massive bodies of any size, ranging from less than one gram up to several tons. However, other objects, for example a computer program or a data file are also physical objects for purposes of this application.

The invention especially relates to massive bodies of any size, weight or dimension. The objects can be units, but they are not limited to units.

The invention also relates to transportation means and physical guides.

Transport of various goods in complex systems requires special control mechanisms.

Current control mechanisms for the delivery of packages, for example within companies or to customers are very much based on special proprietary solutions. Work is ongoing to standardise the control mechanisms, e.g. logistics and workflow management systems, e.g. the Workflow Management Coalition (WFMC). Several companies are working on dedicated software for package delivery systems.

Examples of package delivery systems where sophisticated logistics and workflow management systems are being used, are luggage transport at airports, mail sorting and distribution and computer aided manufacturing in big production companies (e.g. car manufacturing).

The package delivery systems that are out on the market today are very much proprietary based. Furthermore, a lot of programming effort is needed in order to add all the services (such as system malfunction handling, status handling, priority based routing, etc.).

It is further known to exchange information which is packed. Though these information packets have been compared with physical packages, it has not been proposed to assign logical packets to physical packages.

Multiple access communication systems such as cellular telephone networks operate world-wide.

The Internet Protocol is always based on packets as it is based on data packets, so called datagrams, with a maximal length, which is according to the IPv4 standard 64 Kbyte and variable according to the IPv6 standard. Larger data packets are transferred by a plurality of data packets. Each data packet is a fragment of the whole information and travels its own way through the network. As the Internet Protocol does not constitute a connection along which the data packets are transported, it is necessary that every data packet contains the source and target address. The correct sequence of the IP data packets is achieved at the transport service of a higher layer. According to the IPv6 standard all data packets may be routed the same way by using flow label routing. This is similar to virtual circuits.

The routing algorithm is that part of the network layer software responsible for deciding which output line an incoming data packet should be transmitted on. If the subnet uses datagrams internally, this decision must be made anew for every arriving data packet since the best route may have changed since last time. If the subnet uses virtual circuits internally, routing decisions are made only when a new virtual circuit is being set up. Thereafter, data packets just follow the previously established route.

Due to the enormous growth of the Internet and the number of subscribers, the Internet Protocol (IP) is widely deployed. IF is the network layer protocol for the Internet and many other networks. IP, together with several additional protocols, such as, for example, Open Shortest Path First (OSPF) and Internet Control Message Protocols (ICMP), provides network services to the upper layers.

Examples of these network services are end-to end data transport, addressing, fragmentation and reassembly, routing and congestion control.

The IPv6 standard provides additional services. These services include an improved security handling which guarantees authentication and privacy, an enhanced type of service based routing, a flow label routing which is similar to virtual circuits and an unlimited amount of IP addresses including an improved hierarchical addressing scheme.

Furthermore the IPv6 standard provides anycasting. This network service is like multicasting in that a destination is a group of addresses, but instead of trying to deliver the data packet to all of them, it tries to deliver it to just one, usually the nearest one.

Furthermore the IPv6 standard allows strict routing, for example the full path is supplied as well as loose routing, where only selected guides are supplied.

Examples of IP and ATM related protocols are described in the book "Computer Networks", Third edition, by Andrew S. Tannenbaum, Prentice-Hall International (UK) Limited, London 1996.

It has been proposed to build underground supply networks. Reasons for such networks are the high traffic load within cities, harbours and airports. The intention is to have the packages delivered to the underground network, for example by truck, train etc. and do the distribution and supply to the warehouses, shops etc. by means of the underground system.

Several major Dutch cities, for example Leiden, Utrecht, Tilburg, Arnhem, Nijmegen, are currently investigating the applicability of such underground distribution networks. An investigation that was concluded in 1998 has indicated that underground distribution networks like OLS (Ondergronds Logistiek Systeems), as they are called in the Netherlands, are very feasible. In Hoofddorp a decision will be made before the next century on whether such a system will be implemented.

Logistics systems manage the purchase, production and delivery/sales of products. Several logistic systems are available. Examples of these logistics systems are Enterprise Resource Planning (ERP) and Material Requirements Planning (MRP I and II).

Advantageous logistics options are just-in-time delivery, job-shops, flow-shops, Group-Technology cells, push/pull control, material-, capacity- and time-based control. Furthermore a feedforward and/or a feedback control is possible. Further advantageous logistics options include engineering to Order, Make to Order, Assemble to Order, Make to Stock.

SUMMARY OF THE INVENTION

It is an object of the invention to create a method which effectively and efficiently handles transfer of physical objects.

An object of the invention is a method for transporting physical objects, wherein at least one physical object is transported from a sending station to a receiving station, wherein the transport occurs through at least one physical guide, wherein the physical guide executes a decision about further parameters of transport to another physical guide or to the receiving station, wherein information for handling and moving the physical object is generated and transferred to a logical node, wherein the information is used to handle and move the physical packets according to a handling and moving of packets in a telecommunication protocol and wherein the logical node transfers the decision to the sending station and/or at least one physical router.

It is also possible that there is a close one to one relation between routers (in the logical plane) and machines (in the physical plane) and the routers only send control information down to the machines (i.e. no information is needed from the machine to the router), since the physical packet is anyway accompanied by a logical packet.

Most preferably the information is related to a logical transport plane.

Advantageously protocol functionality is added to at least one machine that takes care of a physical routing of the physical objects.

In a preferred embodiment of the method, the transportation system, the transportation means, the physical guide, the computer program and the computer program product, at least one routing mechanism is used.

In an advantageous implementation of the method, the transportation system, the transportation means, the physical guide, the computer program and the computer program product, the routing is performed within a network layer.

Preferably a cell switching technology is used. Asynchronous Transfer Mode (ATM) is an advantageous implementation of a cell switching technology. In ATM the switching may be done on virtual channel identification (VCI) or virtual path (VPI) base. A virtual channel is normally a connection from one source to one destination, although multicast connections are also permitted. Virtual channels are unidirectional, but a pair of circuits can be created at the same time. A group of virtual channels can be grouped together in what is called a virtual path. Conceptually, a virtual path is like a bundle of virtual channels.

ATM supports different service classes by means of ATM Adaptation Layers (AALs).

ATM Adaptation Layer 1 (AAL1) is a realisation of circuit-switched connections with constant bit rate and minimal delay.

ATM Adaptation Layer 2 (AAL2) is a realisation of isochronous connections with variable bit rate and minimal delay.

An ATM Adaptation Layer 3 (AAL3) and an ATM Adaptation Layer 4 (AAL4) may be implemented as well.

An ATM Adaptation Layer 5 (AAL5) is a realisation of connectionless services with variable bit rates and no end-to end synchronisation.

In a preferred embodiment of the method, the transportation system, the transportation means, the physical guide, the computer program and the computer program product, an Internet Control Message Protocol (ICMP) is used.

The operation of the transportation system is monitored by the guides, as it is used within a packet switched network as for example the Internet. When something unexpected occurs, the event is reported by the ICMP, which is also used to test the Internet.

In an advantageous implementation of the method, the transportation system, the transportation means, the physical guide, the computer program and the computer program product, Internet Protocol Addresses are transferred to data link addresses.

It is preferable, that the IP addresses are transferred to the data link addresses according to an address resolution protocol.

The Address Resolution Protocol (ARP) takes care of the mapping of IP addresses onto data link addresses, such as Ethernet. The Reserve Address Resolution Protocol (RARP) transfers data link addresses in IP addresses.

In an advantageous implementation of the method, the transportation system, the transportation means, the physical guide, the computer program and the computer program product, at least one gateway routing protocol is used.

The gateway routing protocol may be an interior gateway routing protocol or an exterior routing protocol. An example of an exterior routing protocol is a Border Gateway Protocol (BGP).

In a preferred embodiment of the method, the transportation system, the transportation means, the physical guide, the computer program and the computer program product, an Open Shortest Path First protocol (OSPF) is used.

OSPF is an interior gateway routing protocol that supports a variety of distance metrics, such as the physical distance, delay etc. The delay metric enables guides to control jitter, since the remaining time to reach the destination is known.

In an advantageous implementation of the method, the transportation system, the transportation means, the physical guide, the computer program and the computer program product, a packet-scheduling algorithm is used.

In a preferred embodiment of the method, the transportation system, the transportation means, the physical guide, the computer program and the computer program product, the packet-scheduling is performed with Weighted Fair Queueing.

Weighted Fair Queueing is a packet-scheduling algorithm used in guides. The mechanism uses a kind of byte-by byte round robin in order to handle several input queues for a certain output queue. The scheduling considers different priority levels.

In an advantageous implementation of the method, the transportation system, the transportation means, the physical guide, the computer program and the computer program product, at least one virtual private network (VPN) is used.

A virtual private network (VPN) is a private network in a public wide area network, meaning that it is solely dedicated to serve the company or companies that own it. A VPN is shielded off from the rest of the traffic on a public wide area network (WAN).

In a preferred embodiment of the method, the transportation system, the transportation means, the physical guide, the computer program and the computer program product, differentiated services are used.

Differentiated services enhancements to a protocol, e.g. the IP protocol are intended to enable scaleable service discrimination in packet switched networks as for example the Internet without the need for signalling at every hop. A variety of services may be built. The services may be either end-to-end or intra-domain. They include both those that can satisfy quantitative requirements, e.g. peak bandwidth and those based on relative performance, e.g. "class" differentiation.

Services can be constructed by a combination of one or more of the following methods:

Setting bits in an IP header field at network boundaries (autonomous system boundaries, internal administrative boundaries or hosts)

Using those bits to determine how packets are forwarded by the nodes inside the network (service differentiation is done here by mapping the bits from the IP packet header to a particular forwarding treatment or perhop behaviour), and Conditioning the marked packets boundaries in accordance with the requirements or rules of each service.

In an advantageous implementation of the method, the transportation system, the transportation means, the physical guide, the computer program and the computer program product, a communication protocol signals a guide to reserve bandwidth for real-time transmission.

An example of a communication protocol that signals a router to reserve bandwidth for real-time transmission is a Resource reSerVation Protocol (RSVP). RSVP is designed to clear a path for audio and video traffic eliminating annoying skips and hesitations. It has been sanctioned by the IETF, because audio and video traffic is expected to increase dramatically on the Internet. However, as the physical objects which have to be moved are much more difficult to produce or to replace than information, it is recommendable to use a communication protocol, that signals to reserve bandwidth for real-time transmission.

In a preferred embodiment of the method, the transportation system, the transportation means, the physical guide, the computer program and the computer program product, a multiprotocol label switching mechanism (MPLS) is used.

MPLS is a technology for backbone networks and can be used for IP as well as other network-layer protocols. It can be deployed in corporate networks as well as in public backbone networks operated by Internet Service Providers (ISP) or telecom network operators.

MPLS simplifies the forwarding in the core routers by introducing a connection-oriented mechanism inside the connectionless IP networks. In a MPLS network a label-switched path is set up for each route or path through the network and the switching of packets is based on these labels, for example instead of the full IP address in the IP header.

In an advantageous implementation of the method, the transportation system, the transportation means, the physical guide, the computer program and the computer program product, at least one site creates at least one home agent for a communication with at least one other site.

Mobile IP is a mechanism to allow for mobility in an IP-based network. Every site that wants to allow its users to roam has to create a home agent. Every site that wants to allow visitors has to create a foreign agent. When a mobile host shows up at a foreign site, it contacts there the foreign host and registers. The foreign host then contacts the user's home agent and gives it a care-of-address, normally the foreign agent's own IP address. The mobile host itself may also act as foreign host.

In a preferred embodiment of the method, the transportation system, the transportation means, the physical guide, the computer program and the computer program product, a Transmission Control Protocol (TCP) is used.

TCP is a transport layer in a high-level domain, e.g. the IP-domain. It is a reliable connection-oriented protocol that allows a byte stream originating on one machine to be delivered without error on any other machine in a packet switched network as for example the Internet.

A suitable protocol in the transport layer, especially a transport layer in an Internet Protocol (IP)-domain has to be used. User Datagram Protocol (UDP) or other connectionless protocols can be used for applications without TCP's sequencing or flow control and wish to provide their own.

In an advantageous implementation of the method, the transportation system, the transportation means, the physical guide, the computer program and the computer program product, a control protocol is used.

H.245, as defined by ITU-T, is a control protocol for multimedia communication. H.245 defines procedures to e.g. allow the exchange of audiovisual and data capabilities.

In a preferred embodiment of the method, the transportation system, the transportation means, the physical guide, the computer program and the computer program product, a Real-Time Protocol (RTP) is used.

RTP is used to handle streaming audio and video.

Embodiments of the invention provide services which are needed or helpful for package delivery by communication protocols of circuit or packet switched networks. Within advantageous implementations of the invention further specific services will be added. It is even more preferable, to supply also the specific services through communication protocols. The communication protocols are especially packet switched networks e.g. the Internet.

BRIEF DESCRIPTION OF THE DRAWINGS

In the following embodiments of the invention will be further described by means of examples and by means of the figures.

The examples use and adapt the packet and circuit switching communication protocols in order to be able to handle the distribution of physical packages. Most of the services provided by the datalink, network, transport and session layer can be reused.

The examples use telecommunication protocols, especially packet-switched and circuit-switched telecommunications protocols and mechanisms to control package delivery, logistics and workflow management systems.

The examples make use of the idea, that these protocols—when modified—already provide the functionality needed.

To achieve an efficient handling of physical objects, especially of packages, different additions may be implemented. Each of them could be combined with each of the transportation systems as described according to the FIGS. 1, 2.

The additions are most preferably implemented in a network layer protocol header. Examples of these additions are described hereinbelow.

One example of additional information is the size of the package. Further information which is useful to be added to the network layer protocol header are due date/time, penalties for late delivery, weight, delivery cost, material, fragility and parameters of required transport, e.g. a cooling truck for goods that have to be cooled.

Basic principles of embodiments of the invention, especially the usage of telecommunication protocols, logical headers and routing mechanisms apply to the transport of every object that can be moved.

The following list provides a non-exhaustive list of logistics options, for example ways to organise the logistics:

Just-in Time delivery, Job-shops, flow-shops, Group-Technology cells, Push/pull control, material-, capacity- and time-based control, Feedforward/feedback control, Engineering to Order, Make to Order, Assemble to Order, Make to Stock.

Whereas known transportation systems transport goods from small envelopes up to objects as big as containers or even bigger. Embodiments of the invention also allow transportation of goods which have not yet been considered as a part of a transportation process, especially a transportation chain.

Additions to the information contained in the network layer protocol header are also a packet speed reduction or acceleration mechanism in order to synchronise the logical packet with the physical package.

It is possible to use a loose or a strict routing function in Internet Protocol (IP) to indicate that corresponding routers have to wait for a message from the transportation system that the physical package has arrived before the logical packet is forwarded.

Within preferred embodiments the above mentioned parameters are incorporated into the routing mechanisms in order to make the corresponding routing decisions. Furthermore, a mechanism is needed to be able to track the packages.

The weighted fair queueing mechanism can be used to provide just in time delivery.

Figure 1:
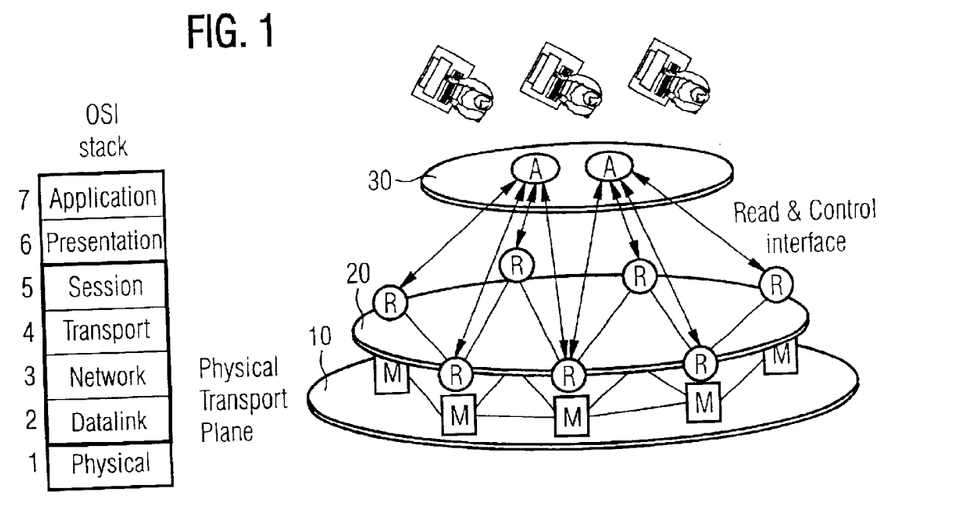
FIG. 1 shows a schematic overview of a transportation system according to the invention.

An advantageous implementation of an embodiment of the invention is described according to FIG. 1. FIG. 1 shows a functional schematic of the transportation system and the transport carried out within the transportation system.

An advantageous implementation of the transportation system and the method of transportation as it is represented in FIG. 1 includes a physical transport layer 10, a logical transport layer 20 and an application layer 30.

A protocol functionality R is added to the machines M that take care of the physical routing of the packages. The lowest layer 10, most preferable the physical transport plane, can be compared to the physical layer in the well known Open System Interconnection (OSI) model, since it takes care of the physical distribution of the packages. The Open System Interconnection has been proposed by the International Telecommunication Union (ITU) in the recommendation X.200. A middle layer 20, most advantageously the logical transport plane, is the layer that reuses the protocols. The middle layer 20 is the control layer and contains at least similar functions as defined for the OSI layers 2, 3, 4 and 5. The middle layer 20 performs the handling of the logical packets and connections. A top layer, especially an applications plane, contains the applications and can be compared to the OSI layers 6 and 7. The applications are administered by operators on top of FIG. 1 The operators may use web-based graphical user interfaces.

Various applications may be used within this embodiment. Examples of these applications are workflow management, statistical information fetching, tracking of the packages, control of the routing of the packages, alarm handling and error handling.

Each package in the physical transport plane may be accompanied by a logical packet in the logical transport plane, but that is not necessary. The logical nodes R in the logical transport plane 20 need to have information about the status, topology etc. of the underlying physical transport network in order to make the right choices. Each package may carry a label with some kind of IP header, for example containing the destination address etc. The physical guides, also called machines M read this label and sent the info to a logical node R. It is advantageous to implement the logical node, which is a kind of a logical guide, into the physical guide M in order to make processing decisions. The processing decision is then sent from the logical node R to the physical guide M. This can very much be compared to per-hop behaviour (R) and forwarding engines (M), as defined for the different guides existing today.

Applications can control and read information from the logical nodes R.

It is preferred to implement a request for comments (RFC).

A Resource reSerVation protocol (RSVP) is a protocol/mechanism to guarantee bandwidth in an IP protocol environment. It may e.g. be used to reserve bandwidth in an airport luggage transport system for business class persons in order to guarantee a fast delivery of the corresponding luggage.

In another advantageous embodiment of the invention the logical transport plane and the physical transport plane are separated. The logical transport plane may e.g. be a local area network or the Internet. This allows a company to reuse the backbone network that is used for speech and data transmission, e.g. an IP backbone.

Figure 2:
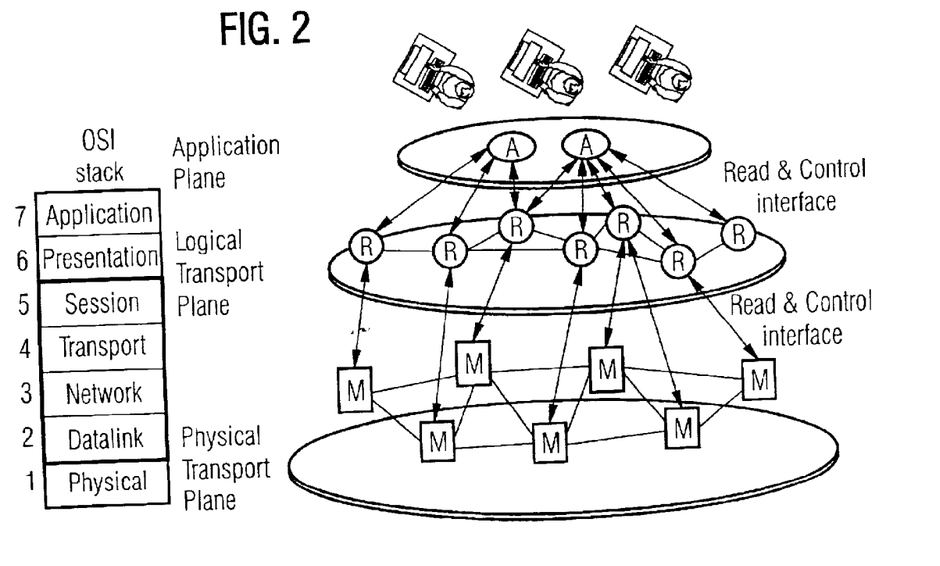
FIG. 2 shows a schematic overview of another preferred embodiment of the invention.

The principle of the further advantageous embodiment is shown schematically in FIG. 2.

The mechanisms are basically the same as for the first alternative.

Routing protocols are preferably used to choose an optimal transport way from one physical guide to another physical guide or to the receiving station. Examples of these routing protocols include metric-based routing and rerouting in case of congestion, e.g. Open Shortest Path First (OSPF), Border Gateway Protocol (BGP).

Another useful protocol mechanism is a specially formatted addressing, especially a global addressing. Examples of the addressing include for example IP-address, mail-alias, Universal Resource Locator (URL).

The described mechanisms are most practically combined with any of the other described mechanisms. Examples of these mechanisms which are suitable for the combination are the Address Resolution Protocol (ARP), especially the Reverse Address Resolution Protocol (RARP). Further suitable is a combination with different routing protocols.

A creation of virtual circuits increases the flexibility of the transportation system.

A transport system like a mail delivery system can use the Internet protocol to internally sort and distribute letters and packages to the correct truck for delivery. The size, due date etc. of each letter and package are determined. Furthermore, the truck is identified by a destination IP address. A communication protocol packet is then used to accompany the letter and package and to deliver the package to the correct destination. It is also possible to add identifications to each letter and package, that contains the IP protocol header. However, in this case scanners are needed.

Externally the same mechanisms may apply. Whereas the letters and the packages are distributed via other networks, the communication packet may accompany the letters and packages via the Internet. This communication packet is then used to make routing decisions and to track the letters and packages.

A further implementation of embodiments of the invention relates to a computer integrated manufacturing company. In a computer integrated manufacturing company the routing of construction parts and tools may be done via an Intranet, based on services provided by the Internet protocols.

Once the size, the due date/time and the destination are determined, the construction parts and tools are accompanied by a communication packet, that takes care of the routing and other network layer related services. Additional services and interfaces are provided by upper layer protocols. In this scenario weighted fair queuing and flow control can be used to achieve just in time delivery.

Weighted fair queuing may also be used to speed up and delay construction parts and tools. Basically this means that construction parts and tools are stored in physical buffers (warehouses etc.).

In an asynchronous transfer mode (ATM) the switching may be done on the virtual channel identifiers (dedicated switching per connection) or on virtual path identifiers (switching of several connections at the same time).

Whenever a package is routed from one country to another for example, the customs at the border of a country could decide that certain packages (or truck loads) have to follow a dedicated route through the country (with intermediate check points). For this purpose the country could have virtual channels allocated for the routing of the corresponding packages. An example of such a mechanism would be the transport of dangerous chemicals via dedicated routes through a country. In case all the trucks from different originating countries have to follow the same route, virtual paths can be used. The virtual path is a collection of virtual channels (each group of trucks from a specific originating country gets a virtual channel assigned). The switching is done on the virtual path, meaning that all virtual channels follow the same route (within that specific country). Afterwards each group of trucks can follow different routes again.

Figure 3:
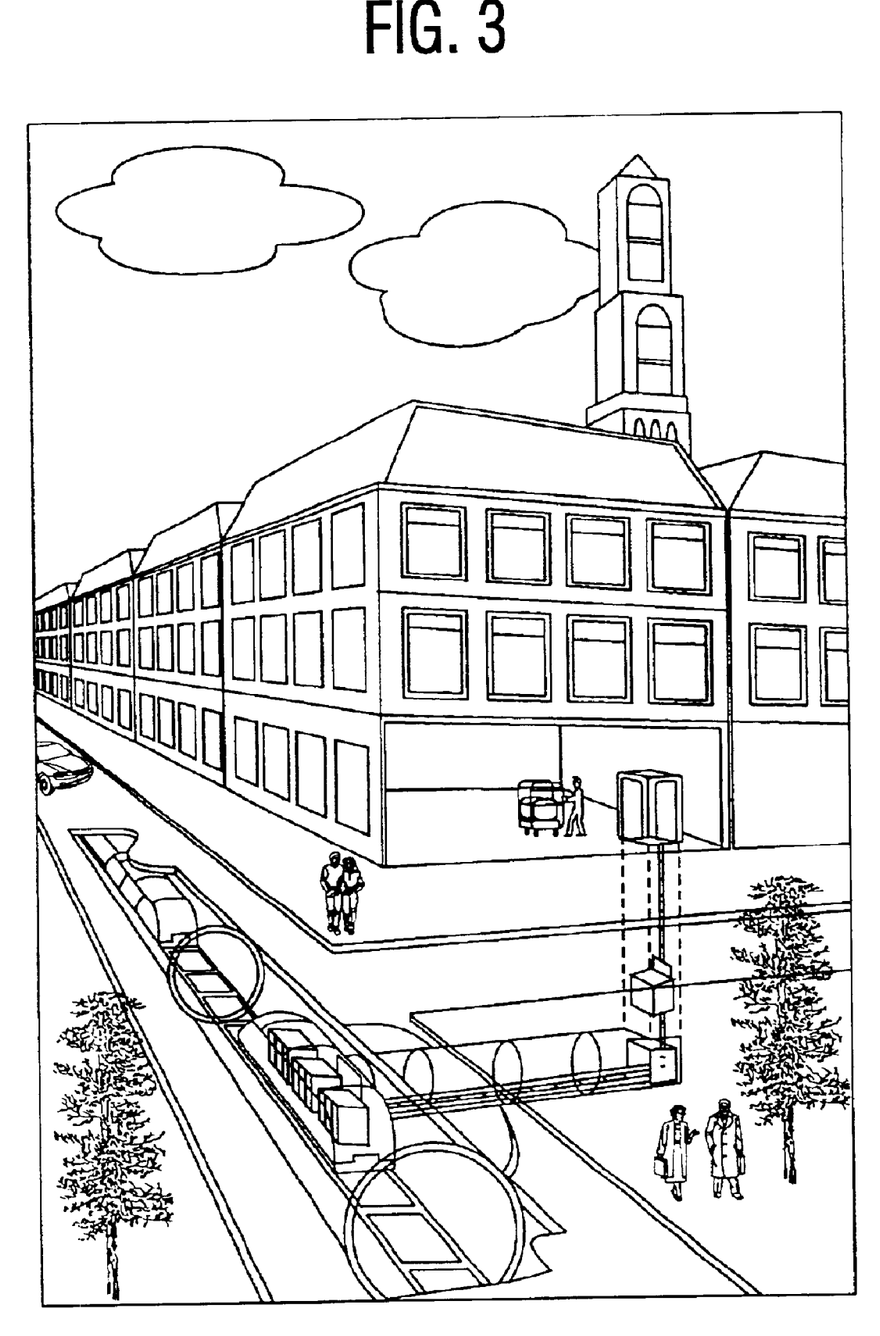
FIG. 3 shows a schematic overview of an underground package delivery system.

In an underground package delivery system an assembly line may be used with fixed sized boxes, as depicted in FIG. 3.

Figure 4:
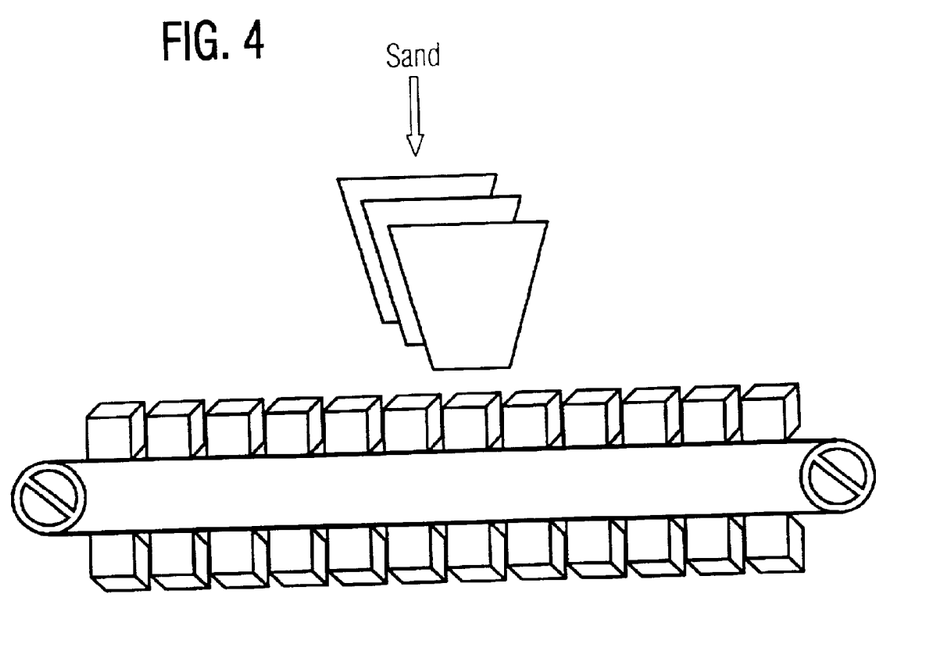
FIG. 4 shows a physical router for objects which can be separated.

Examples of objects which can be separated are for example liquids, powders, powdery objects, grains or grainy objects. In FIG. 4 a physical router for objects which can be separated is depicted. In this example each box can be seen as a cell and may e.g. be filled with sand. It is also possible to fill the boxes with other packages. One could e.g. have cells (i.e. boxes) for a virtual channel in a post office. Boxes go by and whenever there are letters and packages for a specific city, the corresponding box (the cell belongs to the corresponding virtual channel) is filled.

Note that in the example of sand transportation also segmentation and reassembly that are mechanisms of Internet Protocol (IP) may be used.

An introduction of a capability negotiation allows an efficient usage of transport capacities.

Further examples of protocols which may be used to execute the transportation process have been described before. These examples include scheduling mechanisms like Weighted Fair Queuing (WFQ), Transmission Control Protocol (TCP), Real-Time Protocol (RTP), mobile IP to allow mobility of certain hosts like companies, persons, or vehicles.

A domain name server may be used to convert addressing "aliases" (like e-mail name, URL, etc.) to e.g. IP addresses. The domain name server allows an easy change of e.g. address, location, or property.

Through flow control mechanisms it is possible to adapt parameters, especially transport capacities of the transportation system to the need of the users.

If the goods can be separated a segmentation and from time to time also a reassemble may be executed. The segmentation is for example performed at the sending station or at one or more of the mechanical guides.

If for example sand is transported with a ship from one harbour to another harbour, an excavator which digs sand with its shovels in one of the harbours operates as a mechanical guide according to the invention equally, whether the filling of the shovels (the filled shovels), the filling of the lorries or the filled lorries is an object of controlling.

Further functionality can be easily implemented for example to implement acknowledgement and confirmation for different control purposes, for example a financial control. Corresponding mechanisms are implemented for example in TCP.

Broadcasting mechanisms may for example be used in workflow management systems to send reports to all the persons in a company.

Multicasting may be used in the world-wide Internet to send a package to all the subsidiaries of a company or to all customers of a company. Since multicasting is based on multicast groups, where interested parties have to register, every location or customer just registers with a specific multicast group (e.g. the multicast group to get all the latest info about product X) to get all needed information.

The invention may include different examples for error handling. It is especially useful to use Internet Control Message Protocol (ICMP). ICMP is used to report unexpected events.

Whenever a machine detects a problem with the physical package, it can inform the corresponding logical router about this. That router can then use an ICMP message (probably with new error event indications) to inform the originating party in order for that originating party to take corrective actions. ICMP may also be used to inform the operators that are connected via the applications layer.

It is also possible to have more intelligent error handling by e.g. adding some more details (such as location information etc.) to the ICMP message. This information may then be used as input to a knowledge database (artificial intelligence) in order to make new decisions (e.g. new, routing decisions). This may e.g. be used when a truck gets stuck due to an accident. The knowledge database may use the cause of the problem (e.g. retrieved via a board computer and a radio link) and the location information to decide on the priority, the route etc. for the repair equipment.

Existing (subnet) management protocols, such as the Simple Network Management Protocol (SNMP) can be reused for the management of the networks. SNMP messages can be used to configure the routers. New information elements have to be introduced in order to be able to specify the new operations for the package routing. It may also be useful to create an interface from the router to the physical machines in order to relay the configuration messages. This would enable the configuration of the machines via e.g. the Internet and with standardised protocols (such as SNMP).

FIG. 3 shows an underground delivery system, which is a part of a more complex delivery system. Within the delivery system packages are transferred by one mass transport means, for example a train or a truck to a city, where the underground delivery system takes care of the city internal transport of the packages.

The different packages, which are transported within the city, have different sizes, masses and should meet different needs. The different needs are most preferably reflected in special Quality Of Services (QOS) mechanisms. QOS specifications are for example a fast or a secure delivery. Most preferably the QOS specifications are categorised, for example according to special categories, which represent for example goods which have to be consumed soon or different levels of security, wherein the highest level of security refers to confidential documents or to jewels.

Any of the described routing protocols can be used in order to minimise distances, cost, travel time, etc. and to use bandwidths most efficiently.

An addressing is for example performed by a domain name server (DNS).

Special protocols for alarm handling or congestion control allow the system to react flexibly in case of unforeseen events.

It is further advantageous to implement multicasting functions.

Scheduling mechanisms allow further increase of efficiency.

To increase reliability of communication and transportation a Transmission Control Protocol (TCP) is used.

For some parts of the transportation real-time processing is necessary. To enable the system to react in real-time, it is suitable to use a Real-Time Protocol (RTP). An example of a process, which is based on RTP, is a reordering of packages, which is advantageous in the case that the packages have been routed differently.

It is further preferable to monitor the quality of service through a suitable protocol as for example Real-Time Protocol (RTP).

The routing of the packages may be based on a packet-by packet routing mechanism, for example in the case that there is e.g. no dependency between individual packages, but it may also be based on virtual circuits, especially in the case where all packets take the same route through the network.

A reason for doing packet-by-packet routing may be congestion in parts of the network, different routes to be taken due to the fact that the packages have different parameters (such as size or due date), etc.

A reason for using virtual circuits may be to optimise the delivery cost (one ship, one truck etc.) for a whole load.

Figure 5:
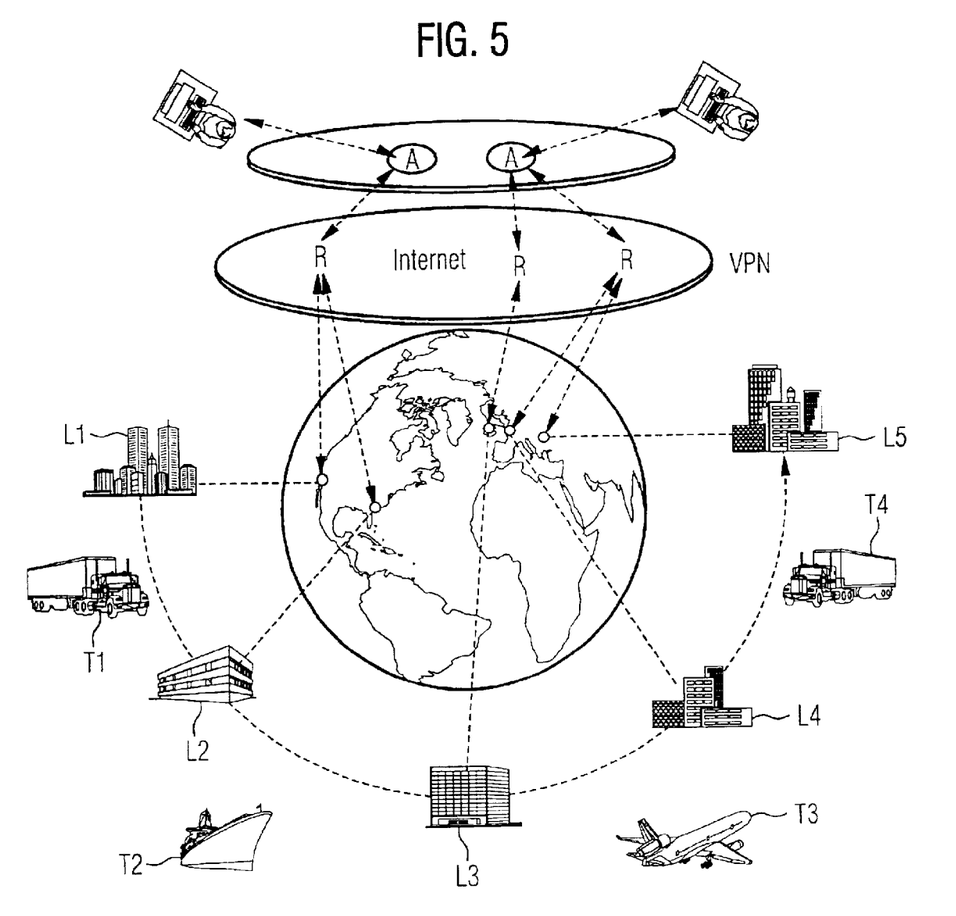
FIG. 5 shows a schematic overview of a preferably global package delivery system.

In FIG. 5 a package delivery system with suitable logistics via a Wide Area Network, such as a packet switched network as for example the Internet is presented. The packages may be transported by using any transport means between different locations. The addressing of the location may be done by means of IP addresses. Intermediate storage can be done by means of ICMP, flow control or a mechanism that only forwards the logical and the physical package after a confirmation from any machine or human interface, for example one of the operators may use a web-based interface to control the routing of the package or to do alarm handling.

Suitable control message protocols are implemented to allow a monitoring for example a congestion control. An example of this protocol is the Internet Control Message Protocol (ICMP).

Further routing protocols are preferably used to choose an optimal transport way from one physical router to another physical router or to the receiving station. Examples of these routing protocols include metric-based routing, cost-based routing.

Further aspects of the transportation system may include:

flow control for JIT

SNMP for management

Diffserv for optimal quality routing

VCs (all packages follow same route)

(global) IP addressing, DNS alarm handling/error control

Mobile IP for host mobility capability negotiation (e.g. Cooling cell availability)

Acknowledgements/Confirmations for financial control

By means of Virtual Private Networks the mechanism as described above could e.g. be used to connect 2 subsidiaries of a company via a packet switched network as for example the Internet.

The package delivery, e.g. the routing part is done via the enhanced packet switched protocols, such as IP. These enhanced protocols take care of the package delivery in the subsidiaries and the Virtual Private Network (VPN).

In mobile networks, such as Universal Mobile Telecommunicaton System (UMTS), Global System for Mobile Communication (GSM) or IP, the system may be implemented by combining the routing information, i.e. information about the location and the status etc. with the positioning information. Furthermore, a truck could e.g. have a UMTS terminal accompanied with a whole load of packages and send at regular intervals, e.g. at locations updating, information about current location etc. to a server, e.g. a Wireless Application Protocol (WAP) server, which has to make sure that the information is incorporated into the routing decisions for the corresponding package, i.e. forward the info to the corresponding router.

It is advantageous to make a car a web domain of its own. Therefore the car becomes one end of a two-way multimedia information and entertainment link. Telematics involves the piping of relevant location-based and traffic-based information into users' cars.

The protocol mechanisms can be used to perform traffic management. For example in case of congestion, a routing protocol could determine, especially in real-time, a different route and guide the car by sending signals to the receiver in the car. An interface from the router to a traffic control system is used. The routing may also be cost-based. In this case the cheapest route should be taken. The importance of cost-based routing will increase when road-usage has to be paid. Packet switched technologies may also be used to select the fastest route.

In the following, embodiments of the invention will be described by different concepts with different connections between actual machines and routing network.

In the first case machines and the routing network have a less tight connection. This solution implies machines, which are capable of physically routing packages in the direction that is indicated to them by a router. It is preferable to take into account, that these machines should first read the IP address of the destination in order to make the routing decision. However, for example the metrics for the routing, for example with regard to size, weight etc., is already available as routing tables in the routers. The routing indication is requested by the machine from the router, which is a new interface, by sending the IP packet header, which includes the new parameters, to the router. The selected outgoing route is then returned by the router.

In the second case the invention is described according to a preferred embodiment in which the actual machines and the routing network have a tighter connection. The physical packages are accompanied by logical packets in the packet switched communication network. Whenever such a packet is received in a router, the router informs the machine on what to do and waits for a confirmation that the actions have been executed.

The two embodiments described above can be combined with each other or with any of the embodiments described before.

For example for an airport luggage system a virtual path could e.g. be used for the entire luggage from a specific flight. Other virtual path mechanisms including resource reservation, for example Differentiated services, RSVP, MPLS, can be used for business class customers in order to get a prioritised and assured handling for them.

A preferred embodiment of the invention relates to a transport system for an airport and a method for transporting suitcases at an airport.

Each physical machine is connected to a router in the logical control plane.

When a suitcase is put on the transport line, a logical packet is generated with a destination IP address (e.g. generated from the flight number). This information is stored in a domain name server, where the flight number is changed to the corresponding IP address. The suitcase is sent via the physical system, whereas the accompanying packet is sent via the logical control plane. At arrival at the next routing machine, that machine interrogates the corresponding router (where the logical packet has already arrived) for further routing information. At reception of the routing information, the physical machine routes the suitcase accordingly. Since there may be several kinds of transport lines, e.g. different sizes, different speeds, etc. each packet may carry additional information. This information may e.g. be the size of the package, the weight, and the flight time (to speed up the routing in case the plane is about to leave). The information is then used in the routing mechanisms. Whenever a logical packet determines that the physical package is delayed, it can send an ICMP message to a central control unit. Note that this mechanism may also be used to detect lost luggage.

A further example relates to global transport system. In this example packages are delivered from location L1 to location L5 according to FIG. 5.

The example describes a transport from a Location L1, for example a factory or another place of origin by a first transport means T1, for example a truck, to a Location L2, in the described case a harbour. The further transport occurs with a further transport means T2, which is in the described example a ship. The transport by the second transport means T2 reaches to a further Location L3, which is in the described example, a combination of a harbour and an airport. From the Location 3 a transport to a Location L4 (airport) occurs through a further suitable transport means T3, which is in the described example a plane. From the Location 4 further transport occurs through further transport means T4, for example a truck. The transport reaches to a final Location L5, for example a company, a shop, or a further destination.

In order to have a dedicated and secured, e.g. IPSEC, (logical) network in the Internet, the company uses a Virtual Private Network (VPN). Note that it is also possible to share this VPN with providers and customers (e.g. when part of a joint venture value chain).

The following steps are to be taken in order to deliver a package from L1 to L4 and L5 (some packages are delivered to L4 and some to L5).

L1 uses the alias L4@ company.com to get the IP address of L4 by interrogating the Domain name server in the Internet. The same is done for L5@ company.com. L1 either knows its own IP address (configuration or a previous DNS interrogation) or it has to fetch the IP address from the DNS server (sending L1@ company.com).

The (physical) packages are accompanied by logical packets in the Internet. These packets may be generated manually, but it is also possible to have them automatically generated from existing documents (such as technical specifications, contracts, sales brochures, etc.). Information, such as the due date, the weight, the fragility, etc. may optionally be added. Also the priority and required Quality of Service (QoS) may be added. This may be done by adding the Differentiated Service Code Point Field in the IP packet header, which defines the required QoS and priority. This will ensure that the packets (and the physical packages) are treated accordingly in case of e.g. congestion in the transport network (e.g. a truck doesn't have enough storage capacity for all packages). The IP addresses of L4 and L5 are added to the corresponding IP headers. For both the IP address of L1 is added as the originating IP address.

L1 now requests routing information from the corresponding router in the Internet. The IP packet information is sent to the router. The router checks the destination address and determines all possible routes to that destination. This is already covered by the standard router implementations and the OSPF routing algorithm. OSPF is also capable of having a metric based routing. One can e.g. define a cost, bandwidth, delay etc. to every route. OSPF will then select the preferred route, depending on information contained in the IP packet header (such as the Differentiated Service Code Point Fields, DSCP). The route characteristics in the logical router have to correspond with the route characteristics in the "physical world". E.g. in order to get from L1 to L2 several transport mechanisms may be used; truck, train, airplane, bus, etc. Each of the transports will have an (average) cost, delay, bandwidth (e.g. storage capacity), etc. defined. The router checks the DSCP in the IP header and selects the corresponding route. In the scenario above the route L2 is selected and the transport is done with the truck (for both the packages L4 and L5).

In order to have a cheap transport, the packages should follow the same route to L4 (where some of the packages are delivered). This can be achieved by using the strict routing functionality as defined in IP. The strict routing function makes sure that certain locations are passed by adding the corresponding locations (i.e. the IP addresses) in the IP header (in the optional extensions part). This will ensure that all packages go via L2, L3 and L4 to the final destinations L4 and L5.

The truck with the physical packages is sent on its way. Also the logical packets in the Internet are routed, based on the IP addresses of L4 and L5.

At arrival in L2 the logical router in the Internet is informed by sending the IP packet header information. The accompanying packet in the Internet has already arrived (and is waiting in the logical router). Optionally, the packet in the Internet may use a timer (added in L1) with the maximum time needed to travel by truck from L1 to L2. When this timer expires, the logical router for R2 may send an ICMP message to L1 in order to indicate the late arrival of the truck (and the corresponding packages). This timer may also be implemented in the router for L1, since it may wait for the arrival of the (successful) ICMP message. The logical router then uses the Internet routing protocols (e.g. Open Shortest Path First (OSPF)) to determine the further routing. The further routing is indicated to L2.

The packages are to be transported by ship (T2) to L3, where a new decision is taken (similar as in L2). Via T3 (plane) the packages arrive at L4, where some of the packages are at the final destination. The logical router in the Internet is informed about the arrival and sends a notification (e.g. an ICMP message) to the originating router (visible from the corresponding IP address in the packet). The originating router then informs the location L1, where this indication may be used for financial control etc.

The packages for L5 continue by truck to L5 where the same procedure may be followed as for the other packages at arrival in L4.

The truck driver (between L1 and L2, L4 and L5) may use a GSM (or UMTS) mobile. This device is used in the PLMN to get location information about the truck (and the corresponding packages). The location information may be used to interrogate a traffic control server in the Internet in order to detect traffic jams etc. The traffic control server returns information about the fastest route to the destination (either L2 or L5). In order to be able to determine the fastest route to the destination, the traffic control server needs the co-ordinates of the truck and the co-ordinates of the destination. This information has to be provided by the truck and the PLMN. The destination information may be send by the truck in a USSD or WAP signalling message. The location information for the truck (mobile) is available in the location server in the PLMN (existing functionality). It is also possible to use a direct connection (i.e. Internet access) from the mobile to the Internet and use a system like GPS to inform the traffic control server about the current location. Furthermore, the traffic control server may have a table with location information per IP address (e.g. the coordinates for the IP address for L2).

Note that the interface between the different locations (L1 . . . L5) and the Internet may also be done with a laptop connected to a GSM mobile station and an Internet dial up connection. It is also possible use a WAP phone or a UMTS phone in the future. This means that it is not necessary to have physical locations that interrogate the routers in the Internet for further information. The truck driver could, for example, fetch this information at arrival in the harbour.

The operators connected via the (web-based) application interfaces may use the ICMP messages to control the routing, the costs, delays, etc. of the different routes. The dynamic configuration of the corresponding route parameters may also be done with the standard Open Shortes Path First (OSPF) and Simple Network Management Protocol (SNMP) mechanisms. The operators may also read the statistics in the routers in order to assemble charts and graphics for management (decision support system). ICMP messages that are generated upon late arrival of a package in a corresponding location may also be used by the operators to take corrective action. Several applications may be defined for the tracking of the different packages.

In order to be sure that the corresponding location can handle the packages at arrival, it is sometimes necessary to negotiate about the capabilities. In case it is necessary to use special equipment for the transport of the packages (e.g. cooling cell), this can be negotiated between the different locations. One could e.g. use the Capability negotiation as defined in H.245 to negotiate between L1 and L2 for the corresponding cooling cells (on the boat).

Between L3 and L2 flow control (datalink layer) may be used to indicate to L2 that no packages are to be send (for a while), since there is for example a strike at the airport, meaning that less packages can be transported by plane. Flow control between L1, L2, L3, L4 and L5 may be used to achieve just-in-time delivery (of course the long transportation times (e.g. ship) have to be taken into account).

Segmentation and reassemble (as defined in IP) may be used e.g. when several trucks are used between L1 and L2 or L4 and L5.

Mobile IP may be used when the transport vehicle uses a mobile device. In that case Mobile IP can be used to address the mobile host (and indirectly the packages).

A further advantageous implementation of the invention relates to an underground transport system. In this example an underground transport system is used to deliver packages to several shops in a street.

At arrival at the underground transport delivery system, the name of the shop is used to get the corresponding IP address of the shop. This IP address is then used as the destination address in the packet in the logical control plane. Each physical routing machine has an interface to a router in the logical control plane. Additional information may be added to the packet (e.g. size of the package, weight, due date, fragility, etc.). This information is then used by the corresponding routing protocols in the logical control plane. Since the logical control plane uses differentiated services, the routing may be based on priority and required quality of service. The routing protocols may e.g. have prioritised routing for fragile packages or expensive packages (e.g. jewels). The cost may also be important, since cheap packages may take channels that don't function that well (e.g. packages get stuck once in a while). In order to get that information, statistics can be collected in the logical control plane. This collection can be done by having counters for the packets that notice that the corresponding physical package is delayed. This delay is noticed when the corresponding packet has already arrived in the router, but the physical package has not arrived yet (no indication received from the machine in the physical plane).

The size of the package (added to the IP header) is used by the routing protocols in order to be able to select channels with the right size for the transport of the packages.

The described examples of transportation systems which are designed and/or operated according to the invention show, that the invention can easily be adapted to other transportation systems. Therefore the invention is not limited to a special transportation system or to any of the described protocols. However, the described protocols are preferable to increase the efficiency and effectiveness of the transportation systems.

The packet switching communication protocols can be adapted to the distribution of physical packages within companies, but also between companies and to end-customers. In case e.g. the Internet Protocols are used for these adapted systems, the world-wide Internet can be deployed to support the routing and delivery of physical packages.

Embodiments of the invention have a wide scope, which includes a reuse of existing packet and circuit switching communication protocols, for example the different routing metrics.

Though embodiments of the invention are carried out with new computer programs, respectively a new computer program product, a major part of the needed software is standardised and widely deployed. This allows interoperability.

Embodiments of the invention further include the possibility to use a worldwide packet switched network such as the Internet for physical distribution of packages.

The invention further allows a reuse of company backbone networks and easier integration with management systems.

Other features like package tracking facilities or an application, e.g. calling a parcel can easily be adapted and integrated.

An important difference between the invention and the state of the art is the fact that the routing machine gets its control (e.g. routing information) from a "logical" router. The control information may be retrieved by accompanying the physical package with a logical packet.

The invention is not limited to packet-switching networks, but may be implemented with circuit-switching networks as well.

The described routers may also be switches. Instead of routing a switching can be used.

One advantageous implementation of a circuit switching technology is based on an ISDN User Part (ISUP). For circuit switching basically the same principles apply as for virtual circuits, e.g. the call forwarding service can be used to forward packages, when a warehouse is burnt down, to another warehouse.

What is claimed is:

1. A method of controlling the transport of a physical object having mass and from a sending station to a receiving station, said method comprising the steps of:
providing a physical transportation network connecting the sending station and the receiving station, said physical transportation network comprising a plurality of physical routers connected by a plurality of physical transportation links which physically transport the physical object from one physical router to another, wherein each physical router has a plurality of incoming and outgoing physical transportation links connected thereto;
associating a logical communication network with the physical transportation network, said logical communication network comprising a plurality of logical routers connected by a plurality of communication links which transport data packets from one logical router to another, wherein each logical router has a plurality of incoming and outgoing ports connected to a plurality of communication links, wherein the logical communication network and the physical transportation network have the same configuration, providing a one-to-one correspondence between the physical routers and the logical routers and between the physical transportation links and the communication links;
routing a data packet through the logical network from the sending station to the receiving station according to rules for handling and moving data packets in a telecommunication protocol;
determining the path taken by the data packet; and
transporting the physical object through the physical network from the sending station to the receiving station over a physical path corresponding to the path taken by the data packet through the logical network.

2. The method according to claim 1, wherein the step of routing a data packet through the logical network includes routing the data packet according to rules for handling and moving data packets in an Internet Protocol (IP) network.

3. The method according to claim 2, wherein the step of association a logical communication network with the physical transportation network includes transferring Internet Protocol Addresses to data link addresses.

4. The method according to claim 3, wherein the Internet Protocol Addresses are transferred to the data link addresses according to an Address Resolution Protocol.

5. The method according to claim 1, wherein the step of routing a data packet through the logical network includes routing the data packet according to rules for handling and moving data packets in a cell switching network.

6. The method according to claim 5, wherein the step of routing the data packet according to rules for handling and moving data packets in a cell switching network includes routing the data packet according to rules for handling and moving data packets in an asynchronous transfer mode network.

7. The method according to claim 1, further comprising utilizing an Internet Control Message Protocol (ICMP) to provide network services to a plurality of upper layers.

8. The method according to claim 1, wherein the step of routing a data packet through the logical network includes routing the data packet according to rules for handling and moving data packets in a network utilizing at least one interior gateway routing protocol.

9. The method according to claim 8, wherein the step of routing the data packet according to rules for handling and moving data packets in a network utilizing at least one interior gateway routing protocol includes routing the data packet according to rules for handling and moving data packets in a network utilizing an open shortest path first protocol.

10. The method according to claim 1, wherein the step of routing a data packet through the logical network includes routing the data packet according to rules for handling and moving data packets in a network utilizing a packet-scheduling algorithm.

11. The method according to claim 10, wherein the step of routing the data packet according to rules for handling and moving data packets in a network utilizing a packet-scheduling algorithm includes routing the data packet according to rules for handling and moving data packets in a network in which packet-scheduling is performed with weighted fair queuing.

12. The method according to claim 1, wherein the step of associating a logical communication network with the physical transportation network includes associating a virtual private network with the physical transportation network.

13. The method according to claim 1, wherein the step of routing a data packet through the logical network includes routing the data packet utilizing differentiated services.

14. The method according to claim 1, wherein the step of routing a data packet through the logical network includes utilizing a communication protocol to signal a router to reserve bandwidth for a real-time transmission.

15. The method according to claim 1, wherein the step of routing a data through the logical network includes routing the data packet utilizing multiprotocol label switching.

16. The method according to claim 1, wherein the step of routing a data packet through the logical network includes routing the data packet according to rules for handling and moving data packets in a transmission control protocol network.

17. The method according to claim 1, wherein the step of routing a data packet through the logical network includes routing the data packet according to rules for handling and moving data packets in a real-time protocol.

18. The method according to claim 1, further comprising synchronizing the routing of the logical packet and the physical object.

19. A system for controlling the transport of a physical object having mass and size from a sending station to a receiving station, said system comprising:

a physical transportation network connecting the sending station end the receiving station, said physical transportation network comprising a plurality of physical routers connected by a plurality of physical transportation links which physically transport the physical object from one physical router to another, wherein each physical router has a plurality of incoming and outgoing physical transportation links connected thereto;

a logical communication network associated with the physical transportation network, said logical communication network comprising, a plurality of logical routers connected by a plurality of communication links which transport data packets from one logical router to another, wherein each logical router has a plurality of incoming and outgoing ports connected to a plurality of communication links, wherein the logical communication network and the physical transportation network have the same configuration, providing a one-to-one correspondence between the physical routers and the logical routers and between the physical transportation links and the communication links;

a communication unit that routes a data packet through the logical network from the sending station to the receiving station according to rules for handling and moving data packets in a telecommunication protocol;

means for determining the path taken by the data packet; and means for controlling the physical network to transport the physical object through the physical network from the sending station to the receiving station over a physical path corresponding to the path taken by the data packet through the logical network.

20. A control system for controlling the transport of a physical object having mass and size between at least two of a sending station, a receiving station, and a physical router, said control system comprising:

a communication network having logical nodes corresponding to the sending station, the receiving station, and the physical router;

means for determining a path followed by a data packet transmitted in accordance with a telecommunication protocol through the communication network between at least two of the logical nodes; and means for transporting the physical object over a physical path corresponding to the path followed by the data packet.

21. A physical guide for interfacing between a logical node in a communication network and a physical router in a corresponding physical transportation network that transports physical objects having mass and size, said physical guide. comprising:

means for interfacing with the logical node to obtain information regarding a path of a data packet transmitted through the communication network in accordance with a telecommunication protocol;

means for determining physical parameters for controlling the physical router, said physical parameters corresponding to the information from the logical node regarding the path of the data packet; and means for controlling the physical router to transport the physical object over a physical path in the physical transportation network corresponding to the path of the data packet through the communication network.

22. A computer program adapted to interface between a logical node in a communication network and a physical router in a corresponding physical transportation network that transports physical objects having mass and size, said computer program comprising:

a software module that interfaces with the logical node to obtain information regarding a path of a data packet transmitted through the communication network in accordance with a telecommunication protocol;

a software module that determines physical parameters for controlling the physical muter, said physical parameters corresponding to the information from the logical node regarding the path of the data packet; and a software module that controls the physical router to transport the physical object over a physical path in the physical transportation network corresponding to the path of the data packet through the communication network.

* * * * *

UNITED STATES PATENT AND TRADEMARK OFFICE
CERTIFICATE OF CORRECTION

PATENT NO. : 6,920,134 B2  Page 1 of 1
APPLICATION NO. : 09/740924
DATED : July 19, 2005
INVENTOR(S) : Heino Hameleers et al.

It is certified that error appears in the above-identified patent and that said Letters Patent is hereby corrected as shown below:

In column 2, Line 22, delete "IF" and insert -- IP --, therefor.

In column 17, Line 44, in Claim 1, after "and" insert -- size --.

In column 18, Line 14, in Claim 3, delete "association" and insert -- associating --.

In column 19, Line 20, in Claim 19, delete "end" and insert -- and --.

In column 20, Line 19, in Claim 21, after "guide" delete ".".

In column 20, Line 43, in Claim 22, delete "muter" and insert -- router --, therefor.

Signed and Sealed this

Twentieth Day of November, 2007

JON W. DUDAS
*Director of the United States Patent and Trademark Office*